Feb. 7, 1961 K. C. GOBALET 2,970,526
PRESSURE SECTIONS FOR BOX FORMING AND BOX CLOSING MACHINES
Filed Dec. 18, 1958 10 Sheets-Sheet 1

INVENTOR.
Kenneth Clyde Gobalet
BY
Howard G. Russell
his ATTORNEY

INVENTOR.
Kenneth Clyde Gobalet

INVENTOR.
Kenneth Clyde Gobalet

INVENTOR.
Kenneth Clyde Gobalet
BY Howard G. Russell
his ATTORNEY

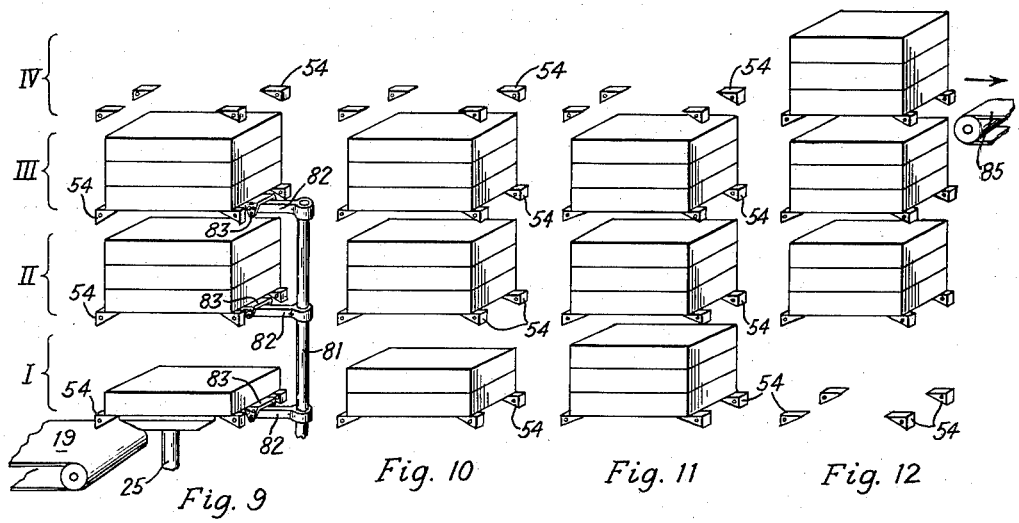
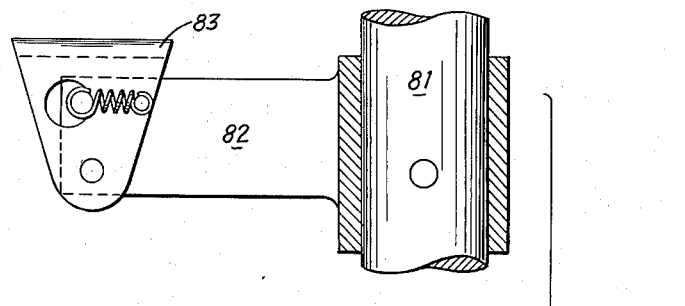
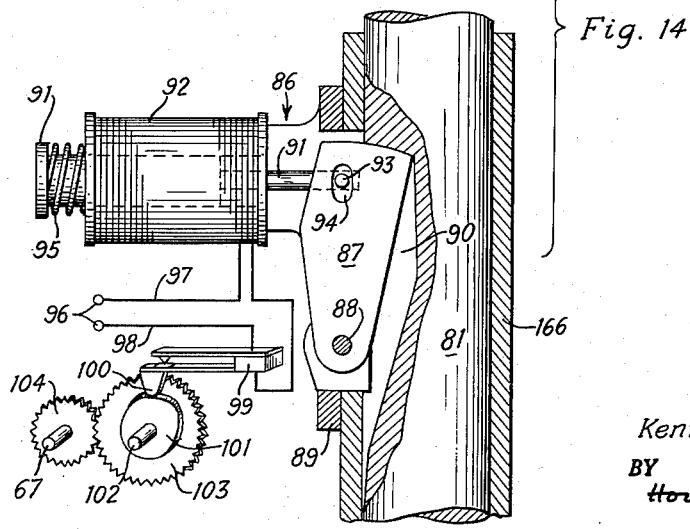

INVENTOR.
Kenneth Clyde Gobalet
BY
Howard G. Russell
ATTORNEY

United States Patent Office 2,970,526
Patented Feb. 7, 1961

2,970,526

PRESSURE SECTIONS FOR BOX FORMING AND BOX CLOSING MACHINES

Kenneth Clyde Gobalet, Redwood City, Calif., assignor to Baljak Corporation, Wilmington, Del., a corporation of Delaware Filed Dec. 18, 1958, Ser. No. 781,313

23 Claims. (Cl. 93—36)

Machines for folding and gluing box blanks, as well as machines for closing folding boxes, generally comprise a so-called pressure section in which the glued portions of the box are maintained under compression for a time sufficient to permit the glue to set.

A pressure section is employed, for example, in a box forming and gluing machine in which a flat box blank is converted into hollow box form, and a pressure system is also employed in a box closing machine performing a gluing operation.

In both instances it is necessary, or desirable, to counteract the tendency of the glued portion of the blank, usually a flap, to return to the position which it occupied prior to the gluing and folding operation, the force tending to disturb the bond being the "fight" of the board at the respective fold line.

Once the glue has set sufficiently to form a bond of adequate strength to hold the flap down, the pressure can be released.

The present invention has application to box forming and to box closing machines, particularly machines of the type in which the box blank, or the box is advanced by a conveyor from station to station for the performance of certain operations. At one of these stations glue is applied to an appropriate portion of the blank or of the box, generally to a flap, by an appropriate applicator, for example a glue wheel, whereafter the conveyor moves the blank or box past a folding station for the performance of a folding operation to bring the flap into adhesive engagement with the wall or other panel of the blank or box.

Thereafter, the conveyor usually continues through a pressure section within which belts, blades or rails bear down upon the flap to maintain the glue joint under compression. A certain amount of time must elapse before the glue sets sufficiently to permit the pressure to be released. It is therefore evident that a pressure section of considerable length is required where the output rate of the machine is high. A long pressure section is also required for low output machines handling boxes of considerable length in relation to their other dimensions.

The present invention permits the pressure section to be made very short, thereby saving valuable floor space.

Machines embodying the present invention employ a pressure section into which the boxes are fed and within which the boxes advance in a direction inclined with respect to the horizontal, preferably in a vertical direction. Since, normally, the vertical dimension of a box is only a fraction of its width or length, the linear advance of the box is relatively slow and the pressure section is very compact requiring only a minimum of floor space. The cross sectional area of the first passageway through which the blank travels prior, and up to the formation of the box is generally smaller than the cross sectional area of the second passageway extending at an angle to the first through which the box then travels and within which it is compressed.

According to a preferred embodiment of the invention the pressure section comprises opposed pressure elements which may have the form of belts or plates and a stack of boxes is normally held in a state of compression between these pressure elements except for brief periods within which a new box is fed into the section by an appropriate feeding mechanism.

The boxes in the shaftway of the vertical pressure unit are thus subjected to periods of compression interrupted by periods of pressure relief during which the boxes advance vertically, preferably upward, to a point where the boxes are then removed either by mechanical means or by hand.

It has been proposed to fold individual box blanks by forcing them into a die by means of a plunger and to eject the resulting box from the die.

It has also been proposed to form boxes by a similar plunger and die arrangement and to stack the formed boxes in a vertical guideway or magazine above the die as a nested stack. The nesting tends to disturb the glue connections, rather than reinforce it by compression.

The various objects, features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figs. 9, 10, 11 and 12 illustrate diagrammatically four phases of the operation of a modified compression unit in which the total stack of boxes is subdivided into levels;

Fig. 14 is a detailed view of a portion of the elevating mechanism for advancing boxes from level to level.

Figure 1:
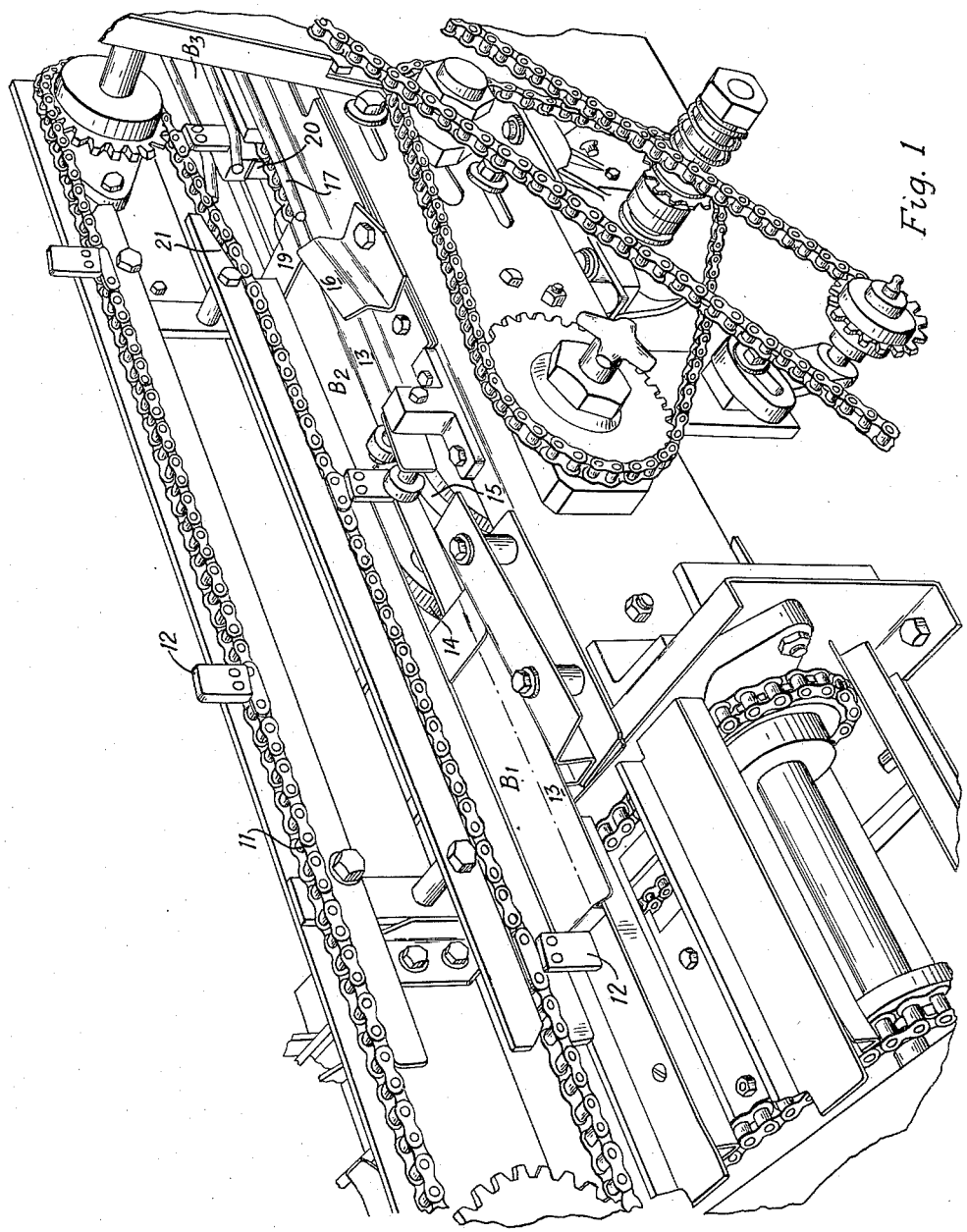
Fig. 1 is a perspective view of the gluing and folding stations of a box closing machine.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of its broader aspects, but it is understood that the details may be modified in various respects without departure from the principles of the invention, and that the invention may be embodied in other forms than shown.

The closing machine of Fig. 1 comprises an overhead conveyor 11 having lugs 12 which engage the trailing wall of boxes B and advance them from left to right.

The outer side wall panels or charlottes 13 of the box $B_1$ extend horizontally and pass over glue wheels 14 and 15 which amply adhesive to the under surface of the charlottes. The boxes than pass within the reach of folding ploughs 16 and rails 17, as shown adjacent box $B_2$, which fold the charlottes down into adhesive engagement with the inner side wall panels of the box. At the point occupied by box $B_3$ the folding operation is nearly complete.

Figure 2:
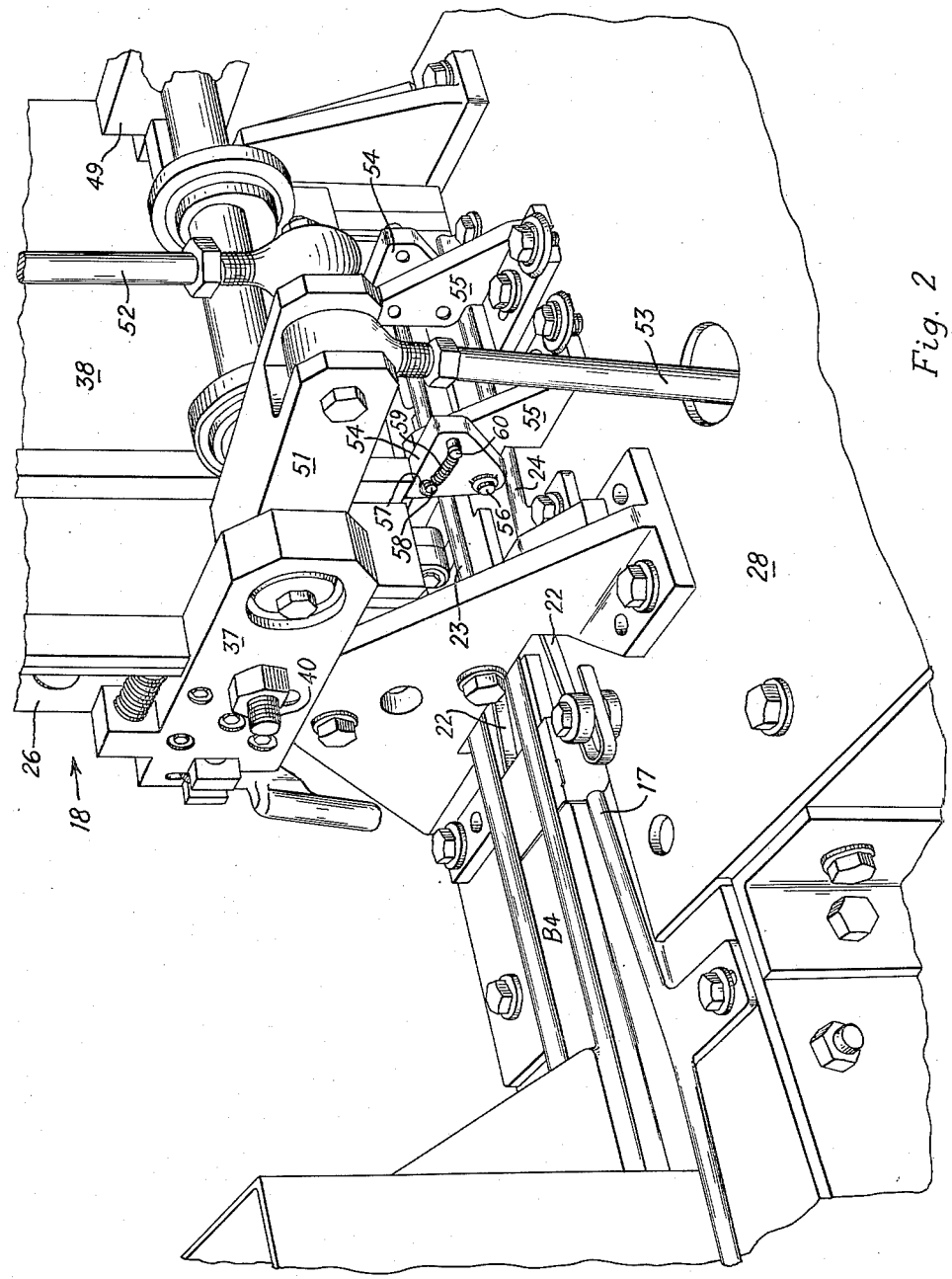
Fig. 2 is a perspective view of a compression unit embodying the invention.
Figure 3:
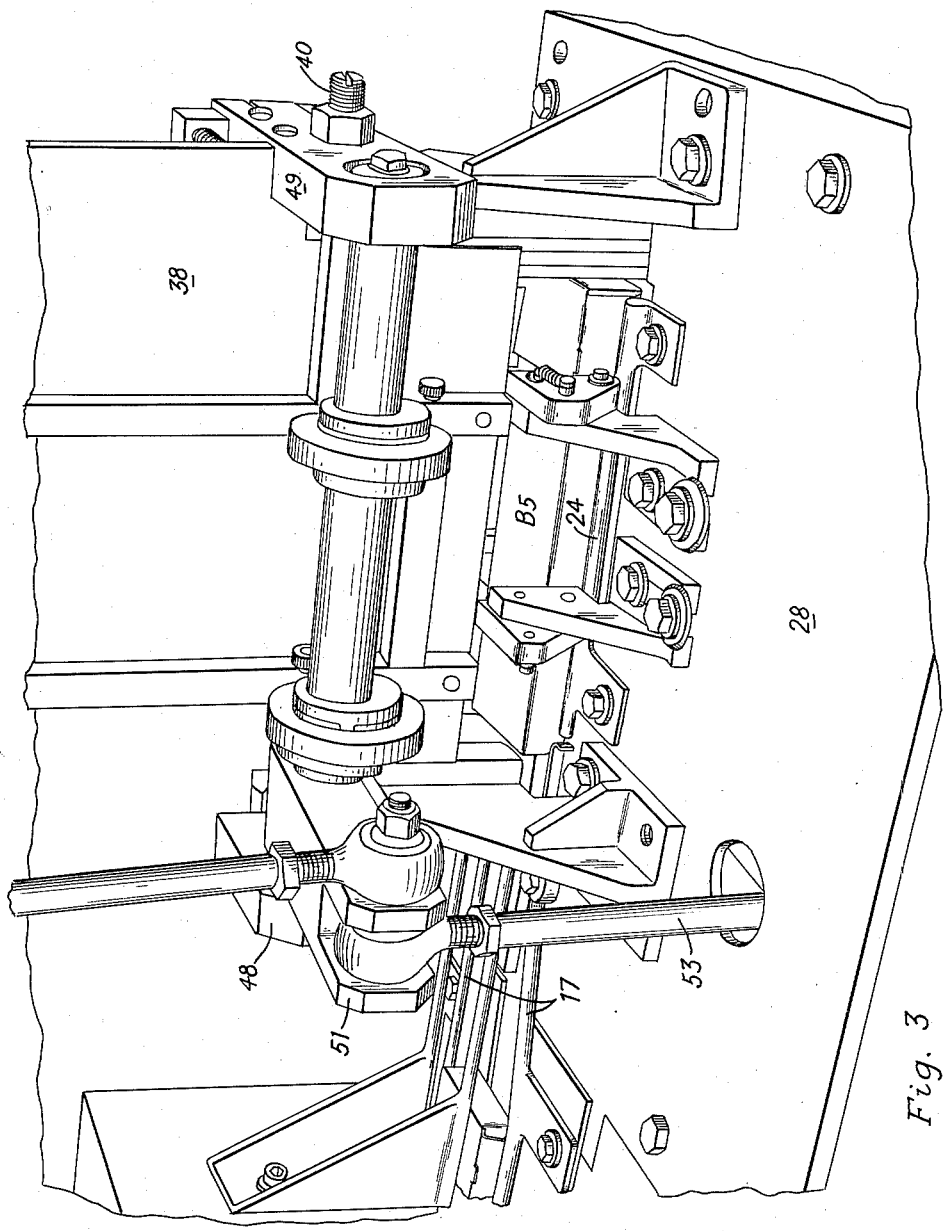
Fig. 3 shows the bottom of the compression unit with a box in position to be advanced into the unit by a feeder.

Turning now to Figs. 2 and 3, the rails 17 terminate a short distance beyond the end of the overhead conveyonr at a point occupied by box $B_4$, as the box is about to enter the compression unit 18 on the right.

The boxes are advanced to the compression unit by a lower conveyor 19 (Fig. 1) having lugs 20 which engage the boxes near the end of the overhead conveyor, where the overhead conveyor chain 11 rises as shown at 21 and its lugs 12 withdraw from engagement with the box.

Figure 4:
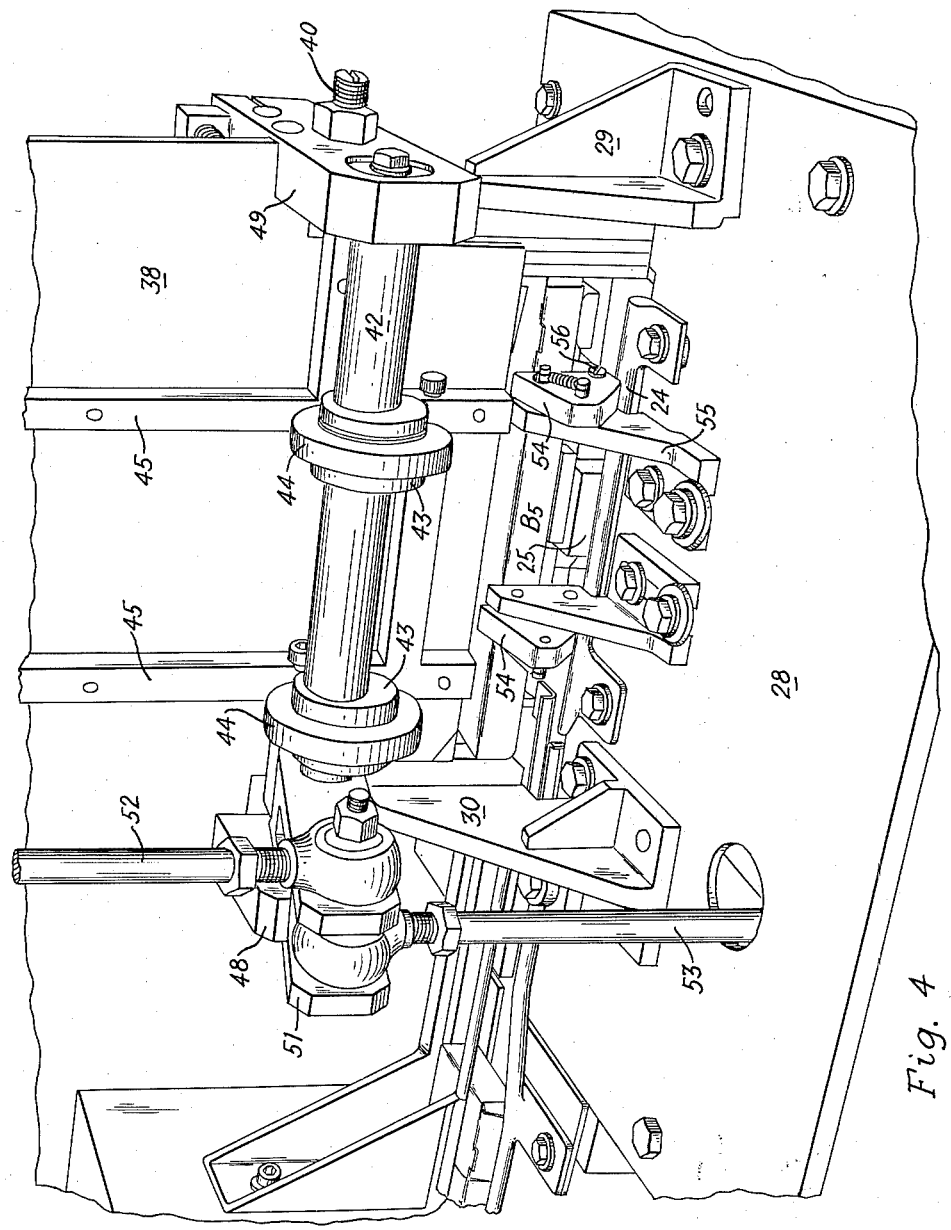
Fig. 4 shows the box engaged by the feeding mechanism shortly before entry between the pressure elements of the unit.

The box moves past flexible flat springs of which one is visible at 22 and which guide the box between lateral rails 23 and 24 at the base of a vertical shaftway structure about to be described. Fig. 3 shows a box $B_5$ seated between the rails 23 and 24 in a position in which the box will be grasped by a plunged 25 rising underneath. The plunger is not visible in Fig. 3, but is seen in Fig. 4 illustrating a phase of the operation where the plunger 25 has lifted the box $B_5$ above the rails 23 and 24.

The construction of the compression unit is best explained by reference to Figs. 8, 7 and 5, in that order, showing the unit from one side, from the end, and from the opposite side.

The shaftway structure comprises two fixed end walls 26 and 27 rigidly mounted on a base 28 by appropriate brackets 29 and 30. The end walls 26 and 27 form guides between which a stack of boxes B is held with freedom to move vertically. The purpose of the compression unit is to compress the boxes B laterally between two pressure elements.

The relatively narrow width of the illustrated boxes permit a construction in which one of the pressure elements is formed as a rigid, normally stationary, side pressure plate 31. For convenience of servicing the pressure plate 31 is mounted on hinges 32, 33 on the end wall 27 and is provided with heavy latches 34 and 35 which engage approximately shaped bars 36 and 37 on the end wall 26.

When the latches are engaged, the pressure plate 31 is immovable with respect to the end walls 26 and 27.

Figure 7:
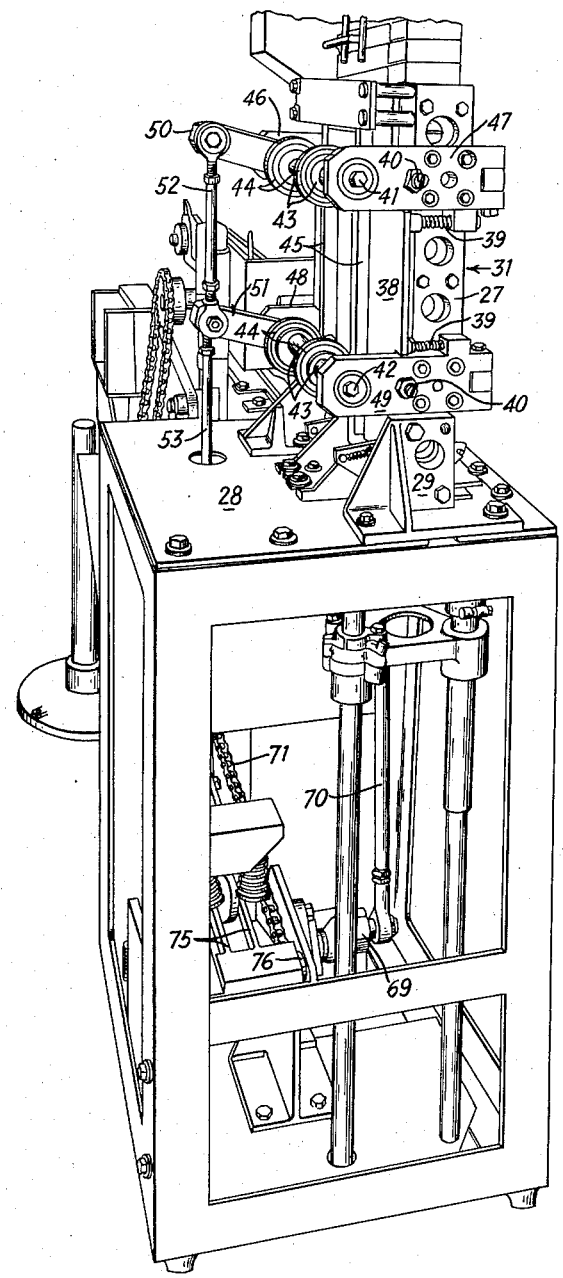
Fig. 7 is a perspective end view of the compression unit.

The opposite pressure plate 38, best seen in Fig. 7, is mounted with freedom to move towards, and away from, the plate 31. In the illustrated construction the plate 38 is urged into a position of maximum spacing with regard to plate 31 by expansion springs 39, and the position of maximum spacing is adjustable by stops 40 in the form of threaded bolts having a tapered front end (not shown) permitting wider spacing in retracted position and narrower spacing in projected position.

A mechanism is provided for urging the plate 38 towards the plate 31 for the purpose of exerting a compressive force on the boxes therebetween. The illustrated form of mechanism comprises two parallel cam shafts 41 and 42, each shaft carrying eccentric disks 43 which, for the purpose of reducing friction, form inner races of roller bearings whose outer rings 44 bear against reinforcing bars 45 on the pressure plate 38 (see also Fig. 4). The shafts 41 and 42 are journaled in brackets 46, 47, 48, 49 on the end walls 26 and 27.

Arms 50 and 51 are interconnected by a tie rod 52 and are keyed to the ends of the cam shafts 41 and 42. It is readily apparent that the downward motion of the arms 50 and 51 causes the eccentric disks 43 to urge the movable pressure plate 38 towards the fixed plate 31.

An actuating rod 53 extends into the base to appropriate mechanism for oscillating the arms 50 and 41. This mechanism will be described later.

The plunger 25 is retractable into a position in which a box can be fed underneath the lower portion of the shaftway as shown in Fig. 2. The plunger 25 has a stroke sufficient to lift the box $B_5$ above catches 54 underneath the pressure elements, plates 31 and 38. Each catch is pivoted to a mounting bracket 55 at its lower portion at 56 and its upper portion comprises a hole 57 throuh which a fixed pin 58 in the bracket 55 extends. The pin is considerably smaller than the hole and limits the extent to which the catch may be tilted in one direction or the other. The catch is normally in projected position towards the path of the plunger by reason of a contraction spring 59 extending between the pin 58 and a further pin 60 on the catch.

Figure 6:
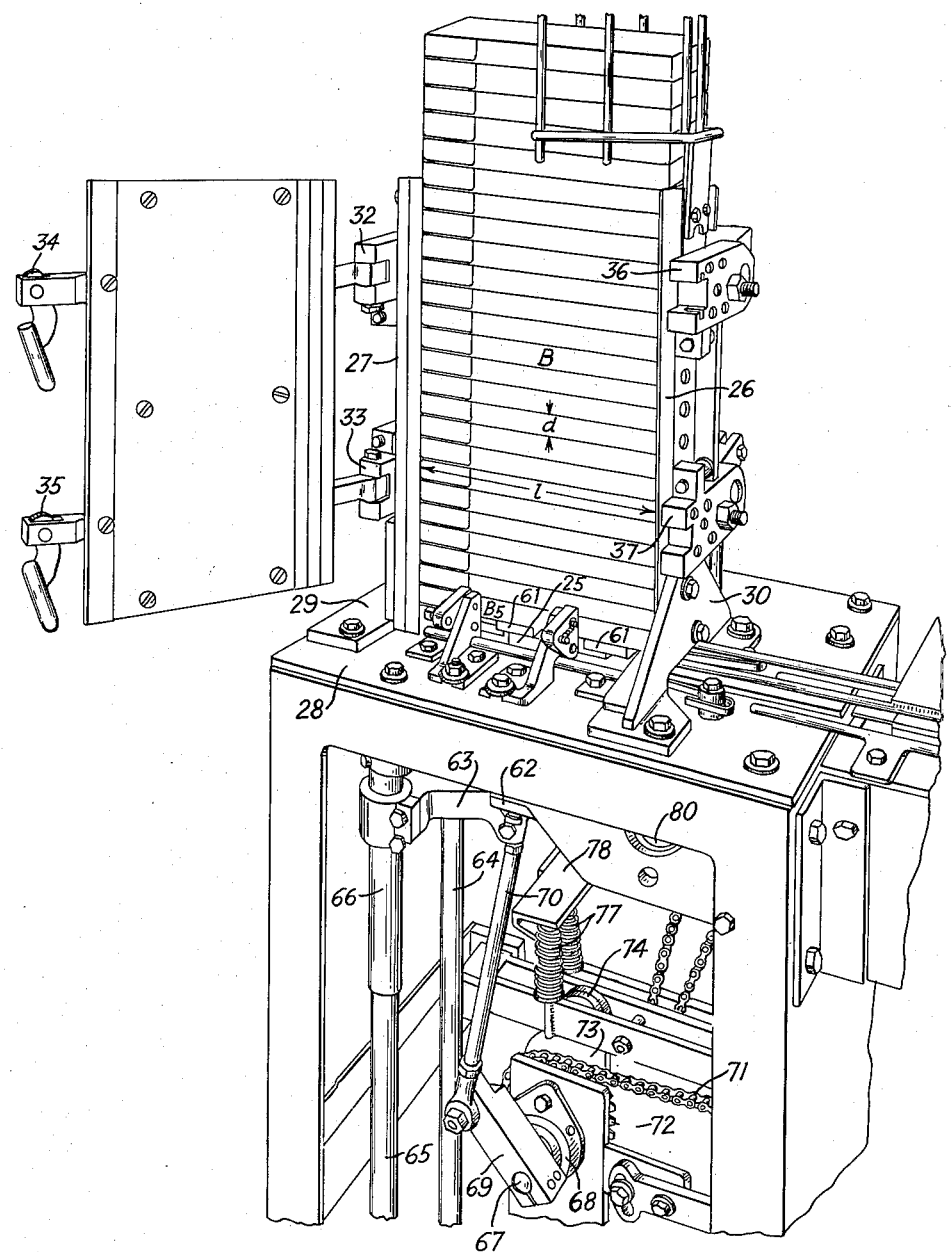
Fig. 6 shows the unit of Fig. 5 at a later phase of the operation at which the feeding mechanism begins to lift the entire stack of boxes in the unit.

The plunger is substantially double T-shaped. The head T portion 61 engages the box $B_5$ and the bottom T portion 62, just visible in Fig. 6, is mounted on a cross head 63. The cross head is slidable on fixed columns 64 and 65 in the base 29. For accurate guidance the cross head 63 may be provided with a sleeve 66.

A crank shaft 67 (Fig. 6) mounted in a bearing 68 on the base carries a crank 69 from which a connecting rod 70 extends to the cross head which, accordingly, moves up and down as the crank shaft 67 rotates. The crank shaft 67 is driven by a chain 71 extending over a sprocket gear 72 on the crank shaft 67.

The crank shaft 67 further carries a cam 73 which is engaged by a roller 74 on an arm 75 composed of two parallel bars pivoted to the base 29 at 76 (Fig. 7). The arm 75 pivotally engages the lower end of the actuating rod 53. The rod 53 rises when the roller 74 engages the rising portion of the cam 73. As a result, the arms 50 and 51 are raised which, in turn, relieves the compressive force of the pressure plate 38.

As the cam 73 retracts under the roller 74, the arm 75 swings downwardly under the action of its weight and the action of two compression springs 77 between the arms 75 and a fixed plate 78 on the base 29. It is thus seen that the compressive force which may be exerted on the boxes in the compression unit is a function of the force of the springs 77. This arrangement prevents overloading of the unit which would cause damage to the boxes or the unit itself.

Figure 8:
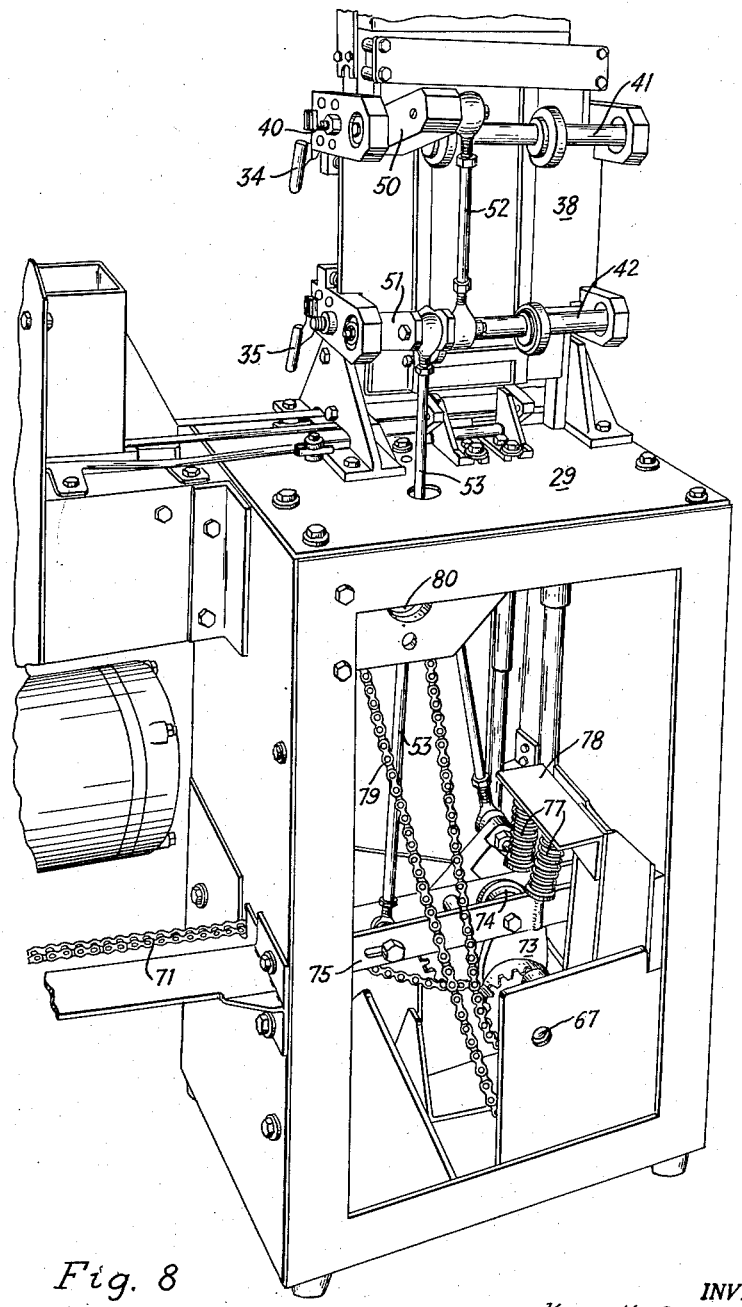
Fig. 8 is a perspective view of the major elements of the driving mechanism.

Fig. 8 further shows the drive chain 71 extending to the left of the base to the drive of the main convyor 11. The drive motor is not shown. A further chain 79 drives the end shaft 80 of the lower conveyor 19 (Fig. 2).

The operation of the compression unit is now readily understood. Boxes fed by the conveyor mechanism into the path of the plunger underneath the shaftway are grasped by the plunger and lifted above the catches 54 at the bottom of the pressure unit.

Figure 5:
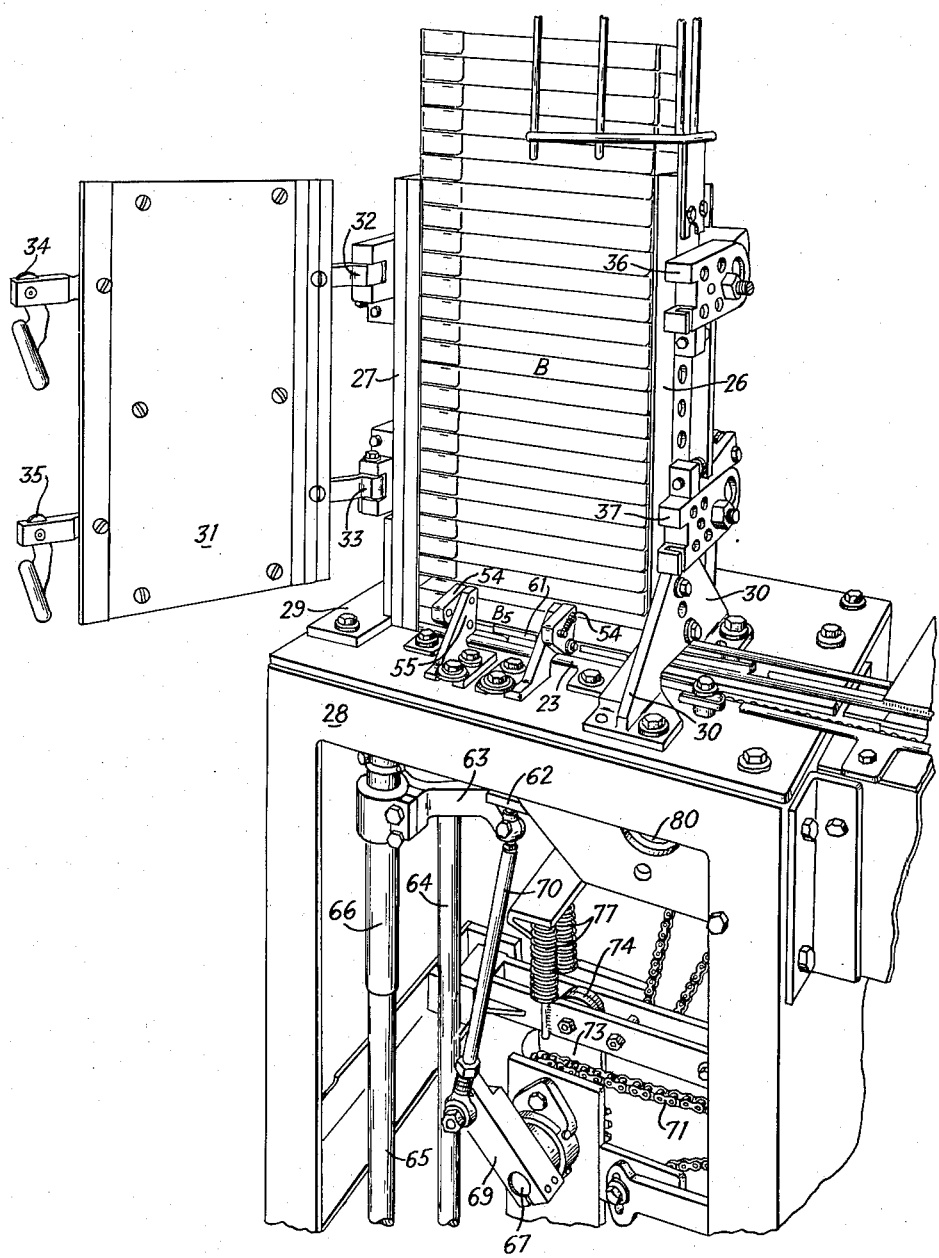
Fig. 5 shows the opposite side of the compression unit at a phase corresponding to that shown in Fig. 4, one pressure plate of the unit being swung open to show the stack of boxes in the unit.

Fig. 5 illustrates the phase of operation at which the plunger has just begun to lift the box $B_5$. In Fig. 6 the box has risen into a position of contact with the lowest box in the shaftway. The plunger motion then continues until the box reaches the position just above the catches 54 which then hold the box $B_5$ in place while the plunger descends. This, incidentally, is the position shown in Fig. 2 in which the plunger is not visible.

As soon as the plunger retracts, the cam mechanism 73, 74, 75, 77 acts to lower the actuating rod 53, thus tilting the arms 50 and 51 downwardly to exert compressive force on the movable pressure plate 38. The pressure is maintained until shortly before the entry of the next box into the shaftway by the plunger.

The stack of boxes advances the distance d vertically for each new box. This is the smallest dimension of the box and contrasts with the dimension 1 which would be the normal advance of the boxes in a conventional horizontal pressure unit.

The illustrated pressure unit has a capacity of twenty boxes, and the particular form of box shown has a dimension d of slightly less than three-quarters of an inch which results in a total height of the unit of about fifteen inches. If an equal number of boxes were moved end to end, they would occupy a space of twenty times the dimension 1 of seven and one-half inches, a total of more than twelve and one-half feet. To this length the spaces between the boxes would be added, resulting in a total length of the unit of the order of twenty feet. By way of contrast the length of the illustrated pressure unit is less than twenty inches.

In certain instances, where the box contents are heavy, it may be undesirable to subject the bottommost box to the full load of all the boxes resting on top. The load actually exceeds the static load or weight of the boxes since the boxes are being accelerated each time they are lifted by the plunger.

Figs. 9 to 12 illustrate diagrammatically an arrangement in which the total stack of boxes in the pressure unit is subdivided into smaller stacks or levels which are then advanced from level to level each time the bottom level is filled. Fig. 9 shows the conveyor 19 advancing boxes to the plunger 25 which lifts the boxes into the lowest level I of the compression unit 18 of which only the catches 54 are shown, there being one set of catches for each of the levels. The pressure elements are not shown for the sake of clarity. After one cycle, two boxes are carried on level I, whereas levels II and III each contain three boxes as shown in Fig. 10. After a further cycle, three boxes are on the bottom level I, as shown in Fig. 11.

At either end of the stack an elevating means is provided, as diagrammatically indicated in Fig. 9 to the right of the stack, the elevating means on the left side being omitted. A rod 81 carries arms 82, one for each level and a catch 83 is mounted on the end of each arm, corresponding in construction to the catches 54.

When the condition of Fig. 11 is reached, the elevating means 81, 82, 83 is actuated to advance the boxes on each level to the next higher level whereby the lowest level is cleared, as shown in Fig. 12, for the entry of a new box being fed by the plunger. The elevating mechanism operates only once for as many boxes as there are on each level.

Figure 13:
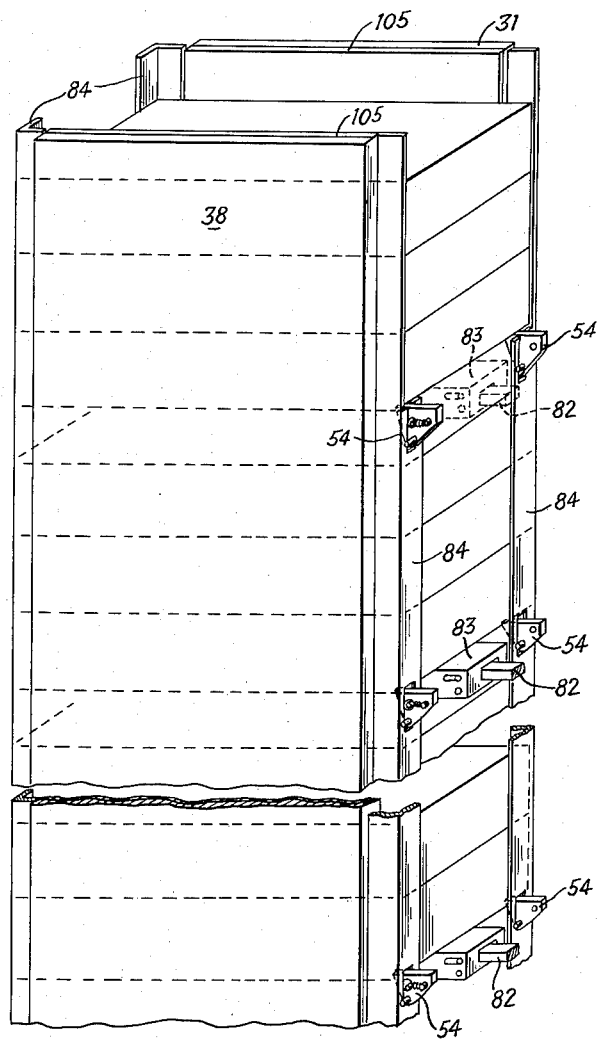
Fig. 13 is a perspective view of the top portion of a compression unit according to Figs. 9 to 12.

Turning now to Fig. 13, the pressure unit comprises four corner angle posts 84 which define the shaftway and guide the boxes. The front portion of the corner post at the right hand side is cut away to permit removal of the boxes from the top level by hand or by means of a conveyor 85, as diagrammatically indicated in Fig. 12. The level catches 54 are mounted in the corner posts at the bottom of each level. Their top surfaces lie in the same plane as the top surface of the catch 83 on the arms 82 of the elevating means.

The pressure plates 31 and 38 are movable towards, and away from, each other in order to exert pressure on the boxes between them and release the pressure, in alternation. The mechanism for moving the plates corresponds to the mechanism of Fig. 7, but is omitted in this figure for the sake of clarity.

The plates 31 and 38 may be faced with a layer 105 of resilient material, for example rubber, in order to equalize the pressure exerted on the box walls.

The box is least compressible in the plane of the walls extending at right angles to the pressure plates, but the box walls yield more readily near the center where the wall has the least support. The resilient facing on the pressure plates tends to compress along the areas or lines at which the box is least compressible and the danger of crushing these box panels is correspondingly reduced. The resilient facing 105 is less compressed along the areas where the box panels offer less resistance to the compressing force and thus exerts nearly uniform pressure over the entire glue area.

Positive separation of the resiliently faced pressure plates reduce friction between the plates and the stack of upwardly moving boxes which are guided between the angle posts 84.

Fig. 14 illustrates the drive of the elevating mechanism. The rod 81 is vertically slidable in the sleeve 166 which may be mounted on the cross head 63 of the plunger. A solenoid-operated clutch 86 is provided for arresting the rod 81 relatively to the sleeve 166 which moves up and down in timed relationship with the movement of the plunger.

The clutch mechanism comprises a latch 87 pivotally mounted at 88 in a mounting bracket 89 on the sleeve 166. The latch 87 fits a correspondingly shaped recess 90 machined in the rod 81 and is linked to an armature 91 of a solenoid 92 by a pin 93 extending through a hole 94 in the latch. A compression spring 95 normally maintains the clutch in the disengaged position.

A source of electric power is represented by terminals 96 from which leads 97 and 98 extend to the solenoid 92 and a make-switch 99, respectively. The switch comprises a follower 100 engaging a cam 101 on a shaft 102 driven by a gear 103 meshing with a further gear 104 on the crank shaft 67.

The gear 104 makes three revolutions for one revolution of the gear 103 and the cam 101 causes the contacts of the switch 99 to be closed once for every three strokes of the plunger 25 driven by the crank shaft 67.

When the switch 99 is closed the latch 87 engages the rod 81 which lifts the boxes on the various levels to the next higher level.

After rotation of the shaft 102 and the cam 101 through a predetermined number of degrees, the switch 99 opens and the solenoid disengages a latch 87, whereafter the sleeve 166 continues to move up and down while the rod 81 remains at rest.

What is claimed is:

1. A compression unit for a folding and gluing machine for folding boxes, the unit comprising, in combination, means forming a passageway at an upward angle to the horizontal; means for feeding glued boxes into the passageway at the bottom and lifting the boxes in the passageway by the height of a box, said passageway including two opposite substantially parallel pressure plates of a vertical dimension sufficient to accommodate between them more than two vertically stacked boxes at the same time; means for normally urging said plates together to compress simultaneously the boxes between the plate surfaces; and means for periodically separating said plates to release the boxes in the passageway for a period sufficient to admit a further box into said passageway between said plates.

2. A compression unit for a folding and gluing machine for folding boxes, the unit comprising, in combination, means forming a passageway upwardly inclined to the horizontal; means for feeding glued boxes into the passageway at the bottom and lifting the boxes in the passageway by not less than the height of a box, said passageway including two opposite substantially parallel pressure plates of a vertical dimension sufficient to accommodate between them more than two boxes at the same time, at least one of said plates being mounted with freedom to move closer to, and away from, the other plate; means timed with said feeding means for urging said plates apart into a position in which said plates exert substantially no compressive force on the boxes in said passageway during the feeding and box lifting operation; and means for periodically urging said plates together to bear with their surfaces against, and exert simultaneously a compressive force on all boxes in said passageway.

3. A compression unit for a folding and gluing machine for folding boxes, the unit comprising, in combination, a reciprocating plunger mounted for movement in a substantially vertical direction; means forming a substantially vertical shaftway substantially in line with the path of said plunger, said shaftway including two opposite substantially parallel pressure plates of a vertical dimension sufficient to accommodate between their surfaces more than two boxes at the same time; means for normally urging said plates together to exert a compressive force on the boxes in said shaftway; means timed with the movement of said plunger for periodically removing the compressive force of said plates on the boxes in the shaftway for a period sufficient for the plunger to feed a further box between said plates.

4. A compression unit for a folding and gluing machine for folding boxes, the unit comprising, in combination, a substantially vertical reciprocating plunger; means forming a substantially vertical shaftway substantially in line with the path of said plunger, said shaftway including two opposite parallel pressure plates of a vertical dimension sufficient to accommodate between their surfaces more than two boxes at the same time, at least one of said plates being mounted with freedom to move closer to, and away from, the path of said plunger; means for urging said plates apart into a position in which said plates exert substantially no compressive force on the boxes in said shaftway; and means timed with the movement of said plunger for periodically urging said plates together to make contact with, and exert a compressive force on, the several boxes between said plates.

5. A compression unit for a folding and gluing machine for folding boxes, the unit comprising, in combination, means forming a substantially vertical shaftway including two opposite pressure plates of a vertical dimension sufficient to accommodate between them a stack of more than two boxes at the same time, at least one of said plates being mounted with freedom to move closer to, and away from, the other plate; means for intermittently feeding glued boxes into the shaftway at the bottom and lifting boxes in said shaftway vertically; and means operated in timed relationship with said feeding means for moving at least said one plate to decrease and increase the space between the plates periodically so as to exert substantially horizontally directed compressive force on the boxes between the plates and relieve said force, in alternation, relief being timed to coincide with vertical advance of the boxes.

6. A compression unit for a folding and gluing machine for folding boxes, the unit comprising, in combination, means forming a substantially vertical shaftway including two opposite pressure plates of a vertical dimension sufficient to accommodate between them a stack of more than two boxes at the same time, at least one of said plates being mounted with freedom to move closer to, and away from, the other plate so as to exert substantially horizontally directed compressive force on boxes between said plates and release said force; a plunger for intermittently feeding glued boxes into said shaftway at the bottom and lifting boxes in said shaftway vertically; detent means for retaining boxes in said shaftway during withdrawal of the plunger; and means operated in timed relationship with said plunger for moving at least said one plate in such a way as to increase and decrease the space between them periodically, increase in space being timed to coincide with vertical advance of the boxes by the plunger.

7. A compression unit for a folding and gluing machine for folding boxes, the unit comprising, in combination, means forming a substantially vertical shaftway including two opposite pressure plates of a vertical dimension sufficient to accommodate between them more than two boxes at the same time, at least one of said plates being mounted with freedom to move closer to, and away from, the other plate so as to exert compressive force on boxes between said plates and release said force; a plunger for intermittently feeding glued boxes into, and lifting boxes within, said shaftway; detent means for retaining boxes in said shaftway during withdrawal of the plunger; spring means for normally urging said plates apart; and means operated in timed relationship with said plunger for moving the plates in a direction to decrease the space between them to apply compressive force during withdrawal of the plunger.

8. A compression unit for a folding and gluing machine for folding boxes, the unit comprising, in combination, means forming a substantially vertical shaftway including two opposite pressure plates of a vertical dimension sufficient to accommodate between them more than two boxes at the same time, at least one of said plates being mounted with freedom to move closer to, and away from, the other plate so as to exert compressive force on boxes between said plates and release said force; a plunger for intermittently feeding glued boxes into, and elevating boxes within, said shaftway; detent means for retaining boxes in said shaftway during withdrawal of the plunger; spring means for normally urging said plates apart; a reciprocating rod moved in timed relationship with said plunger; and cam means operated by said rod for moving said plates in a direction to decrease the space between them, opposite to the action of said spring during withdrawal of the plunger.

9. A compression unit for a folding and gluing machine for folding boxes, the unit comprising, in combination, means forming a substantially vertical shaftway, said shaftway including two opposite pressure elements, at least one of the elements being mounted with freedom to move closer to, and away from, the other element; vertically spaced detent means mounted in said shaftway in vertical levels in such a way that the detent means of a higher level supports a plurality of boxes vertically spaced from the topmost box of the stack on the detent means of the level immediately beneath said higher level; means for feeding glued boxes individually into the shaftway above the detent means of the lowest level; elevating means for periodically elevating stacks of boxes in said shaftway to the next higher level; means operated in timed relationship with said feeding means for adjusting the spacing of said elements to decrease and increase the space between them periodically so as to exert compressive force on the boxes between said elements while the boxes are at rest and relieve said force while the boxes are being advanced.

10. A compression unit for a folding and gluing machine for folding boxes, the unit comprising, in combination, means forming a substantially vertical shaftway, said shaftway including two opposite pressure elements, at least one of the elements being mounted with freedom to move closer to, and away from, the other element; detent means mounted in said shaftway in vertical levels in such a way that the detent means of a higher level supports a plurality of boxes spaced against physical contact with the topmost box of the stack on the detent means of the level immediately beneath said higher level; a plunger mounted for freedom to advance and retract for individually lifting during its advance glued boxes into the shaftway into a position above the detent means of the lowest level; means operated in timed relationship with said plunger for moving said elements relatively to each other to decrease and increase the space between them to exert compressive force on the boxes between said elements during retraction of the plunger, and to relieve said force during advance of the plunger, in alternation; and elevating means for periodically elevating stacks of boxes in said shaftway to the next higher level during a period of compression relief.

11. A compression unit for a folding and gluing machine for folding boxes, the unit comprising, in combination, means forming a substantially vertical shaftway, said shaftway including two opposite pressure plates, at least one of the plates being mounted with freedom to move closer to, and away from, the other plate; detent means mounted in said shaftway in vertical levels in such a way that the detent means of a higher level supports a plurality of boxes spaced against physical contact with the topmost box of the stack immediately beneath said higher level; a plunger mounted for freedom to advance and retract for individually feeding during its advance glued boxes into the shaftway into a position above, and for engagement with, the detent means of the lowest level; means operated in timed relationship with the retracting and advancing motion of said plunger for adjusting the relative position of said plates so as to exert, and relieve, respectively, a compressive force on boxes between said plates; and elevating means for periodically elevating stacks of boxes in said shaftway to the next higher level, said elevating means being operated at a lesser frequency than said plunger.

12. In a box blank folding and gluing machine comprising a glue applicator, the combination of a substantially horizontally extending conveyor for advancing folded box blanks from said glue applicator; means forming a substantially vertical shaftway at the end of said conveyor, said shaftway means including two opposite pressure plates of a vertical dimension sufficient to accommodate between them more than two boxes at the same time, at least one of the plates being free to move relatively to the other so as to exert compressive force on boxes between said plates and to relieve said force; means at the end of said conveyor for intermittently feeding glued boxes into, and advancing boxes within, the shaftway; and means operating in timed relationship with said feeding means for actuating said plates to exert compressive force on boxes in said shaftway, and to relieve the compressive force, in timed sequence, pressure relief being timed to coincide with the box advance.

13. In a box blank folding and gluing machine comprising a glue applicator, the combination of a substantially horizontally extending conveyor for advancing folded box blanks from said glue applicator; means forming a substantially vertical shaftway at the end of said conveyor, said shaftway means including two opposite pressure plates of a vertical dimension sufficient to accommodate between them more than two boxes at the same time, at least one of the plates being free to move relatively to the other in a direction to exert compressive force on boxes between the plates, and to relieve said force; a substantially vertically reciprocating plunger mounted in a position to receive boxes from said conveyor when retracted and feed them into said shaftway by an advancing plunger motion; and means operating in timed relationship with said plunger for moving said pressure plates relatively to each other to exert compressive force on boxes in said shaftway, and relieve the compressive force, in timed sequence, pressure relief being timed to coincide with the plunger advance.

14. In a blank folding and gluing machine comprising a glue applicator, the combination of a substantially horizontally extending conveyor for advancing folded box blanks from said glue applicator; means forming a substantially vertical shaftway at the end of said conveyor, said shaftway means including two opposite pressure plates of a vertical dimension sufficient to accommodate more than two boxes between the plates at the same time, at least one of the plates being free to move relatively to the other in a direction to exert compressive force on the boxes between the plates, and to relieve said force, respectively; detent means within the lower portion of said shaftway for retaining boxes stacked in said shaftway; a substantially vertically reciprocating plunger mounted in a position to receive boxes from said conveyor and feed them into said shaftway into a position above said detent means by more than the height of one box; and means operating in timed relationship with said plunger for moving said pressure plates relatively to each other to exert compressive force on boxes in said shaftway, and to relieve the compressive force, in timed sequence, pressure relief being timed to coincide with the feeding of a box into said shaftway by the plunger.

15. In a blank folding and gluing machine comprising a glue applicator, the combination of a substantially horizontally extending conveyor for advancing folded box blanks from said glue applicator; means forming a substantially vertical shaftway at the end of said conveyor; said shaftway means including two opposite pressure plates of a vertical dimension sufficient to accommodate more than two boxes between the plates at the same time, at least one of the plates being free to move towards, and away from, the other; plate operating means for periodically moving at least one of the plates towards the other to exert compressive force on the boxes between the plates and away from the other to relieve said force, in alternation; detent means within the lower portion of said shaftway for retaining boxes stacked in said shaftway during periods of pressure relief; a plunger mounted for reciprocating motion in a position to receive boxes from said conveyor and feed them individually into said shaftway to a level above said detent means; and joint power means for driving said conveyor, said plate operating means and said plunger in timed relationship, the feeding stroke of the plunger being timed to coincide with pressure relief.

16. A compression unit for a folding and gluing machine for folding boxes, the unit comprising, in combination, means forming a passageway upwardly inclined to the horizontal including two opposite pressure plates of a vertical dimension sufficient to accommodate between them more than two boxes at the same time, at least one of said plates being mounted with freedom to move closer to, and away from, the other plate; a layer of a resilient material on at least one of said plates on the side facing the interior of the passageway; means for intermittently advancing glued boxes through the passageway; and means operated in timed relationship with said advancing means for moving said plates to decrease and increase the space between the plates periodically so as to exert compressive force on the boxes between the plates when the boxes are at rest and relieve said force when the boxes are being advanced, in alternation.

17. A compression unit for a folding and gluing machine for folding boxes, the unit comprising, in combination, means forming a substantially vertical shaftway including two opposite pressure plates of a vertical dimension sufficient to accommodate between them more than two boxes at the same time, at least one of said plates being mounted with freedom to move closer to, and away from, the other plate so as to exert compressive force on boxes between said plates and relieve said force; a layer of a resilient material on both of said plates on the side facing the interior of the shaftway; a plunger for intermittently feeding glued boxes into, and advancing boxes through, said shaftway; detent means for retaining boxes in said shaftway during withdrawal of the plunger; and means operated in timed relationship with said plunger for moving said plates in such a way as to increase and decrease the space between them periodically to coincide with periods when the boxes are being advanced or at rest, respectively.

18. In the method of making glued folding boxes, the steps of advancing the box blanks in substantially horizontal direction while folding certain portions of the blanks into box forming adhesively secured position; and then intermittently advancing the boxes in a substantially vertical direction to form a stack in which the bottom of one box rests on the top of the next box while subjecting the glued box portions of the boxes in the stack to compressive force, the application of compressive force being repeated and intermittent, alternating with periods of vertical advance.

19. In the method of making glued folding boxes, the steps of advancing the box blanks in substantially horizontal direction while folding certain portions of the blanks into box forming adhesively secured position; and then alternately exerting substantially horizontal mechanical compressive force on the glued blank portions of the same box and relieving said compressive force, while intermittently advancing the boxes in a substantially vertical direction to form a stack in which the bottom of one box rests on the top of the next box to subject boxes to the weight of boxes resting thereon, the periods of vertical advance being timed to coincide with the periods of compression relief.

20. In the method of making glued folding boxes, the steps of advancing the box blanks in substantially horizontal direction while folding certain portions of the blanks into box forming adhesively secured position; then alternately exerting substantially horizontally directed compressive force on the glued blank portions of the same box and relieving said compressive force, while intermittently advancing the boxes in a substantially vertical direction, the periods of vertical advance being timed to coincide with the periods of compression relief; maintaining during the last recited step the boxes in groups arranged in vertically spaced levels, each level tall enough to contain a plurality of boxes stacked on top of one another; and periodically advancing the groups from their respective vertical levels to the next higher level.

21. In the method of making a glued folding box, the steps of advancing the box blank in substantially horizontal direction while folding certain portions of the blank into box forming adhesively secured position; then intermittently advancing the box in a substantially vertical direction while subjecting the glued blank portions to substantially horizontally directed compressive force, the application of compressive force being repeated and intermittent, alternating with periods of vertical advance; and maintaining the boxes in groups during the last recited step of vertical advancement, the groups being arranged in vertically spaced levels, each level tall enough to contain a plurality of boxes stacked on top of one another, feeding newly glued boxes into the lowest level only, and periodically advancing the groups from their respective vertical levels to the next higher level, the group advance being at a lesser frequency than the advance of individual boxes within the lowest level.

22. In the method of making glued folding boxes, the steps of first advancing the box blanks in a substantially horizontal direction along a first path while folding and adhesively securing together certain portions of the blanks to form boxes; then diverting the boxes from the first path and intermittently advancing them along a second path at an upward angle to the first path while subjecting the glued box portions to substantially horizontally directed compressive force, the application of compressive force being repeated and intermittent, alternating with periods of upward advance.

23. In the method of making glued folding boxes, the steps of first advancing the box blanks in a substantially horizontal direction, while folding and adhesively securing certain portions of the blanks in box form; and then intermittently advancing the formed boxes in a new direction at an upward angle to the previous horizontal direction of advance to form a stack in which the bottom of a box rests on top of the next box thereby subjecting the box below to the box weight resting on its top while repeatedly and intermittently subjecting the glued box portions to substantially horizontally directed compressive force, the application of force being timed to alternate with periods of advance of the boxes.

References Cited in the file of this patent

UNITED STATES PATENTS

| | | |
|---|---|---|
| 1,969,581 | Rose | Aug. 7, 1934 |
| 2,044,606 | Federwitz | June 16, 1936 |
| 2,346,776 | Malhoit | Apr. 18, 1944 |